(No Model.) 4 Sheets—Sheet 3.

J. F. THEURER.
PROCESS OF AND APPARATUS FOR RECLAIMING GAS EMPLOYED IN DISPLACING LIQUIDS.

No. 572,779. Patented Dec. 8, 1896.

(No Model.) 4 Sheets—Sheet 4.

J. F. THEURER.
PROCESS OF AND APPARATUS FOR RECLAIMING GAS EMPLOYED IN DISPLACING LIQUIDS.

No. 572,779. Patented Dec. 8, 1896.

Witnesses:
Geo. W. Young,
Chas. L. Goss.

Inventor:
Jacob F. Theurer,
By Winkler Flanders Smith Bottum
Attorneys.

UNITED STATES PATENT OFFICE.

JACOB F. THEURER, OF MILWAUKEE, WISCONSIN, ASSIGNOR TO THE PABST BREWING COMPANY, OF SAME PLACE.

PROCESS OF AND APPARATUS FOR RECLAIMING GAS EMPLOYED IN DISPLACING LIQUIDS.

SPECIFICATION forming part of Letters Patent No. 572,779, dated December 8, 1896.

Application filed December 4, 1893. Serial No. 492,673. (No model.)

*To all whom it may concern:*

Be it known that I, JACOB F. THEURER, of Milwaukee, in the county of Milwaukee and State of Wisconsin, have invented certain new and useful Improvements in Processes of and Apparatus for Recovering and Reusing Gas Employed to Displace Liquids for Bottling and other Purposes; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to recover and reuse gas which has been employed to empty a cask or other vessel containing beer or other liquids which deteriorate in contact with ordinary atmospheric air; and it consists, essentially, of the process of and apparatus for accomplishing that object, as hereinafter particularly described, and pointed out in the claims, the process consisting generally in forcing the gas from the vessel in which it has displaced a liquid into a tank or receiver, from which it may be taken for further use by refilling the previously-emptied vessel with a liquid.

It is desirable in drawing, bottling, or transferring beer and other carbonated beverages to exclude from the containing casks or vessels air, in contact with which such beverages rapidly deteriorate, losing their carbonic-acid gas, and hence their life and freshness. To avoid this, carbonic-acid gas has been employed to a certain extent for displacing such liquids in the vessels from which they are taken; but its use has been greatly restricted on account of its cost and the wasteful method of using it, the gas having heretofore been used but once and then lost.

It is contemplated by my process and apparatus to use the gas over and over again indefinitely, supplying only the slight or comparatively small loss occurring from leakage and absorption with new gas.

In the accompanying drawings, illustrating different forms of apparatus embodying my invention, like letters designate the same parts in the several figures.

Figure 1:
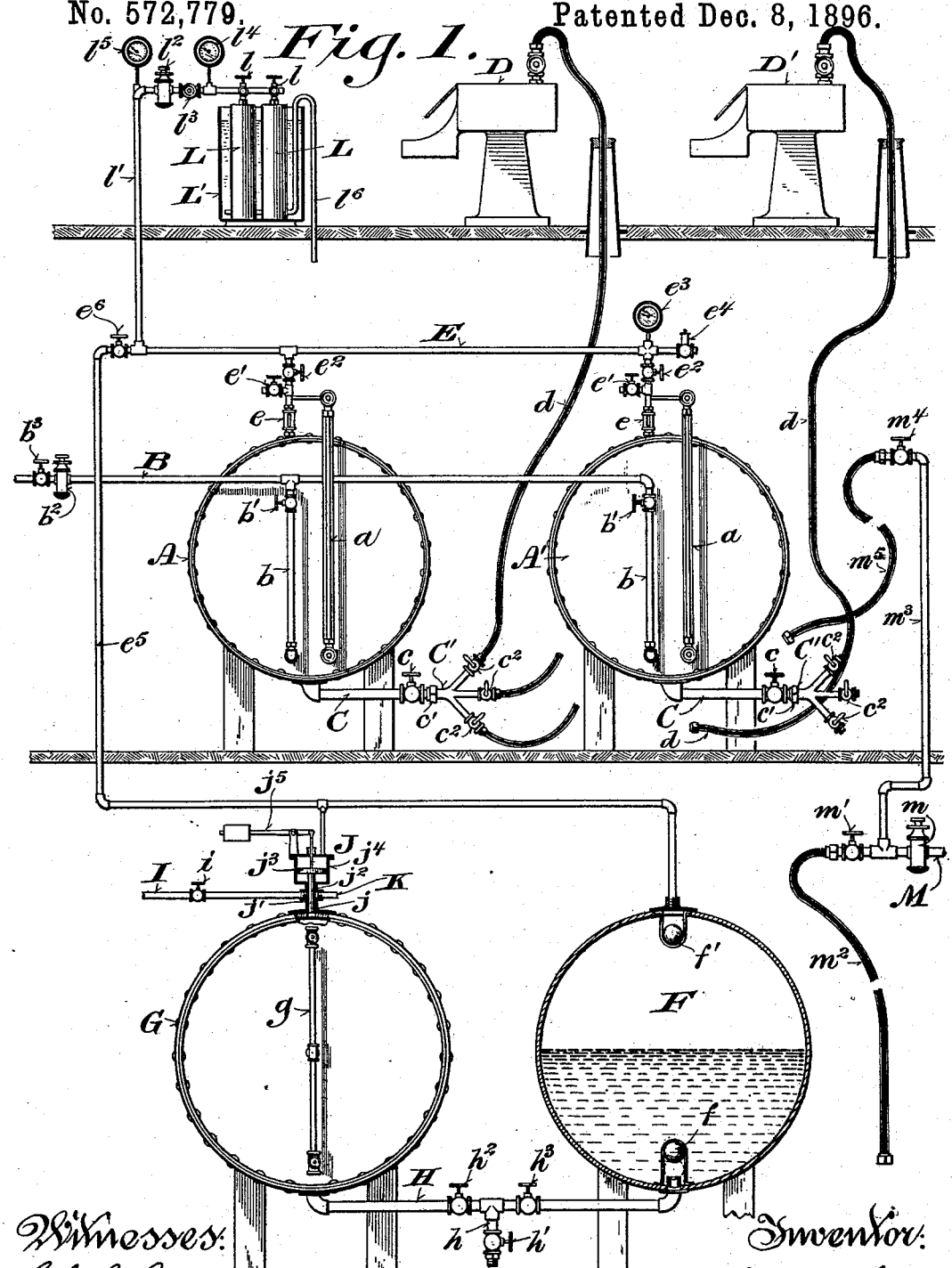
Figure 2:
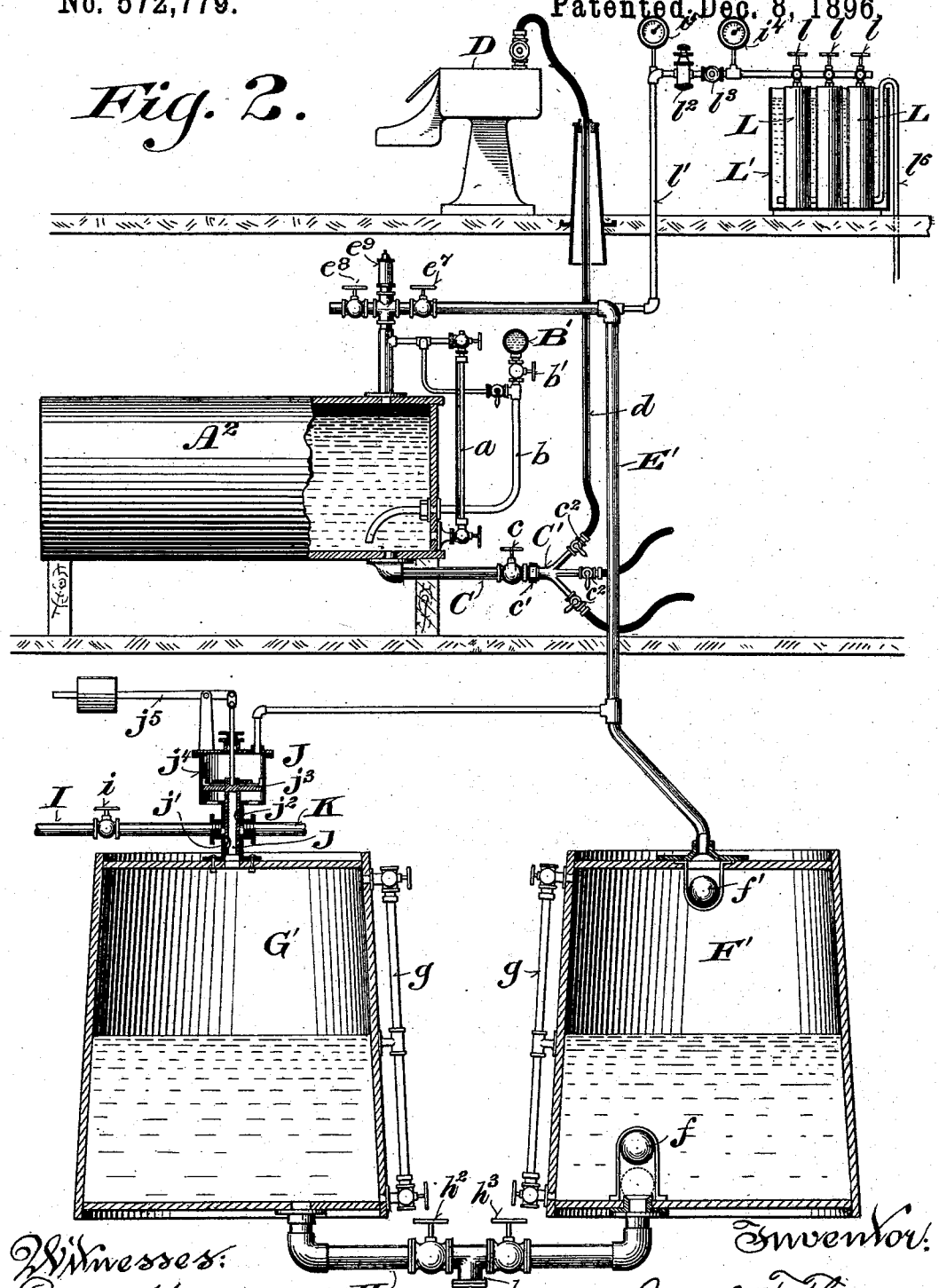
Figure 3:
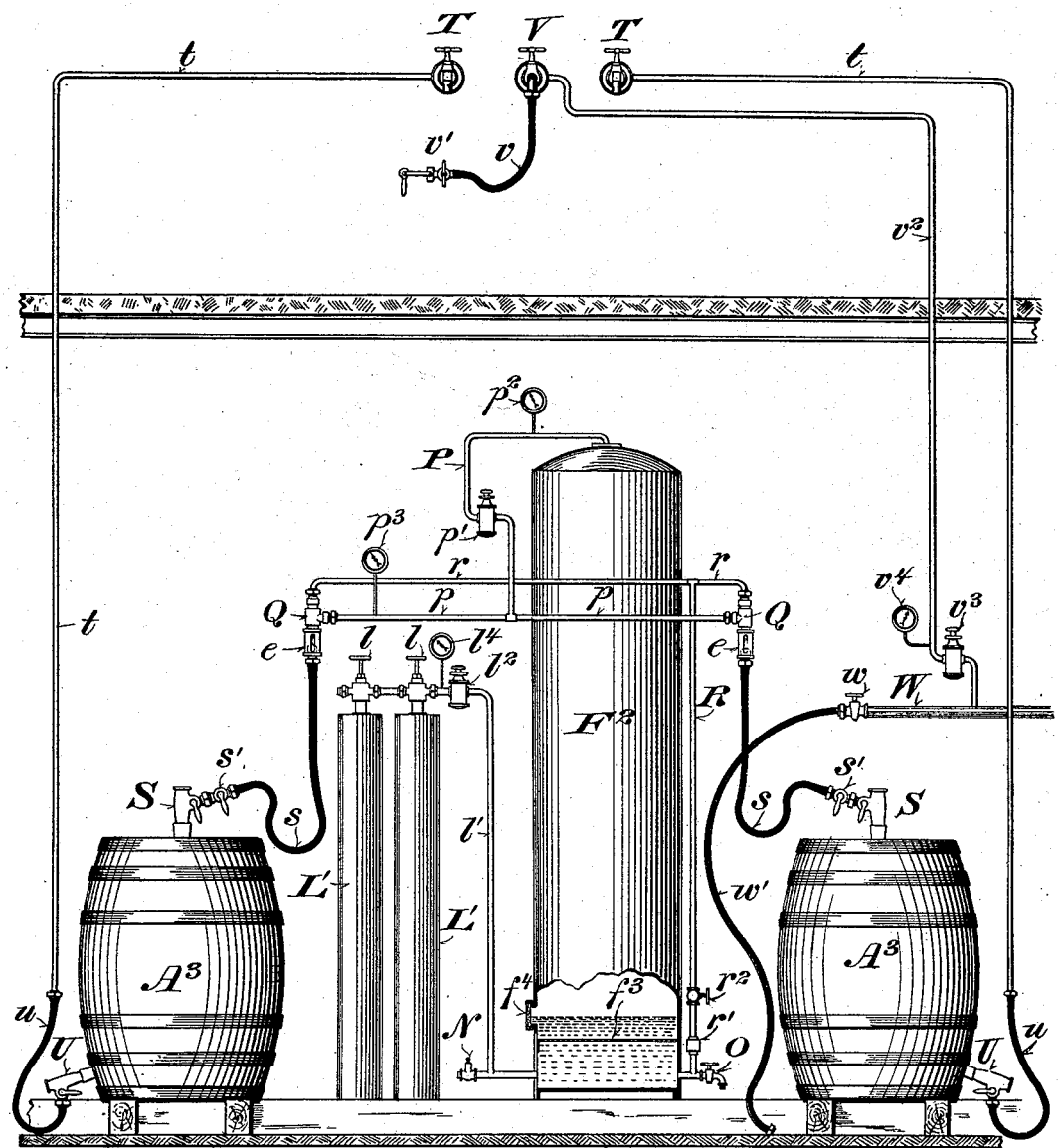
Figure 5:
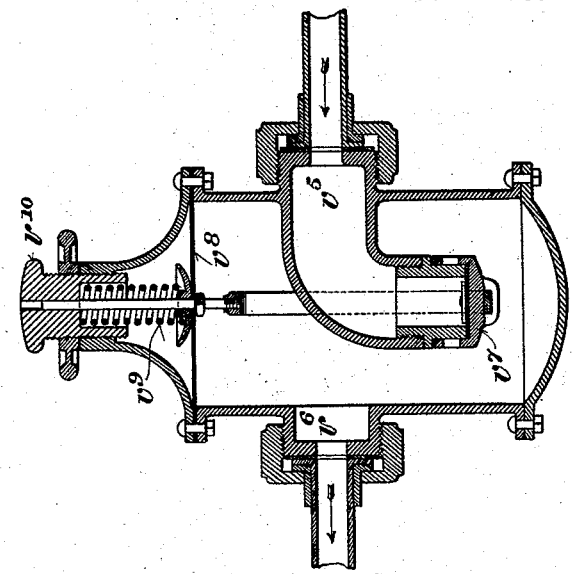
Figure 4:
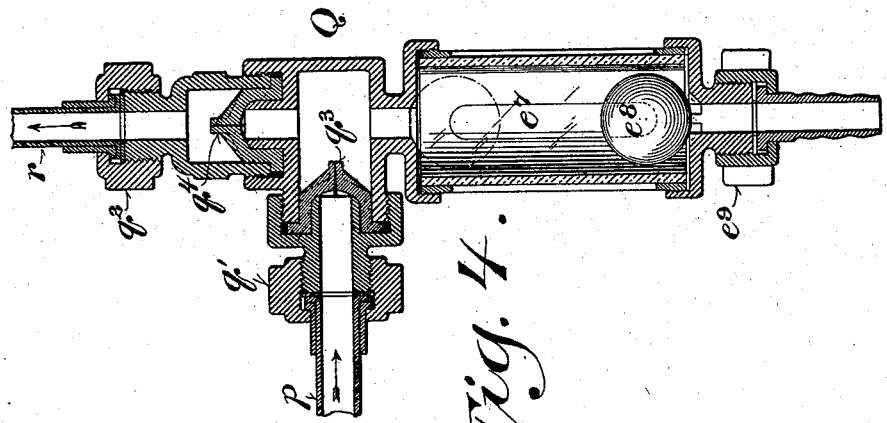

Figure 1 is a view, partly in vertical section and partly in elevation, of apparatus designed for use in breweries or bottling-works for elevating the beer or other liquid to be bottled from the storage or measuring cisterns or tanks to the bottle-filling machines. Fig. 2 is a similar view of a modified form of apparatus for the same purpose. Fig. 3 is a similar view of another modification of the apparatus designed for use in hotels and saloons for forcing the beer or other beverage from the casks or receptacles in which it is contained to the drawing-cocks or bar-faucets for immediate consumption. Fig. 4 is a sectional view, on an enlarged scale, of one of the lanterns and the associated float and check valves as they are arranged for use in the apparatus shown in Fig. 3; and Fig. 5 is a similar view of a reduction-valve suitable for employment in either form of the apparatus.

Referring to Fig. 1, A A' represent measuring-tanks or storage-cisterns such as are commonly employed in breweries. They are preferably made of metal to better withstand the internal pressure to which they are subjected and to prevent the escape of gas, but may be made of wood or any other suitable material and of any convenient size and shape.

B is a pipe leading from the tanks of the storage-cellars and connected by branches $b\, b$, which are provided with valves $b'\, b'$, with said tanks at or near the bottom thereof. Each tank is provided with a glass gage $a$, by means of which the level of the liquid therein may be observed.

C C are pipes leading out of the bottoms of said tanks and each provided with a valve $c$ and pipe or hose coupling $c'$ for the attachment of a hose or a branch pipe connection or Y C', each of the branches of which has a valve $c^2$ and hose connection. Any of these branches may be connected by a pipe or hose $d$ with one of the bottling-machines or filling apparatus D D', which in the present case are shown as located on the floor above said tanks. The upper parts of said tanks are connected by a pipe E and branches thereof, each of which is provided with a lantern $e$, containing a float valve or ball like or similar to that shown in Fig. 4, a vent-valve $e'$, and a valve $e^2$. The pipe E is provided with a pressure-gage $e^3$ and a safety-valve $e^4$.

F and G are two large tanks, each equal to or greater in capacity than either of the tanks A A'. They may be of any suitable shape and are preferably made of metal, but any other suitable material may be employed in their construction. They may be located, as shown, in a basement or room below the tanks A A', or in any convenient place. They are connected with each other at the bottom by a pipe H, which is provided with a branch connection $h$, having a valve $h'$, and on opposite sides thereof with valves $h^2$ and $h^3$. Each of said tanks is provided with a glass gage $g$ for observing the level of the liquid therein. The tank F, which constitutes a gas holder or receiver, is connected by a pipe $e^5$, having a valve $e^6$, with pipe E, and is provided with float balls or valves $f$ and $f'$, held in cages over or adjacent to the openings therefrom into pipes H and $e^5$, respectively.

I is a pipe provided with a valve $i$ and connected with a pump or air-compressor (not shown) and with a pressure-regulating valve or device J, attached to the top of tank G and comprising a tube $j$, open at one end, which communicates with said tank, and having lateral openings $j'$ and $j^2$ out of line with each other, a piston $j^3$, formed or attached to said tube, a cylinder or casing $j^4$, in which said tube and piston are fitted, and an adjustably-weighted lever $j^5$, fulcrumed to said casing and connected with said piston. The pipe I and a vent or waste pipe K are connected with the valve-casing opposite each other and the tube $j$, the openings in which are arranged to register, respectively, with the openings into said pipes. The cylinder $j^4$ is connected by a branch pipe above the piston $j^3$ with the pipe $e^5$.

L L designate a number of reservoirs, one or more of which is employed to contain gas under high pressure. They are each provided with a valve and coupling $l$, by which they are attached to pipe $l'$, connected with the pipe E. The pipe $l'$ is provided with a reduction-valve $l^2$, like or similar to that shown in detail in Fig. 5, and between it and the reservoirs L with a valve $l^3$, by means of which all of said reservoirs may be disconnected from pipe E. A pressure-gage $l^4$ is connected with said pipe $l'$, between the valve $l^3$ and said reservoirs, and a pressure-gage $l^5$ may be connected therewith on the opposite side of the reduction-valve. The reservoirs L may be placed in a tank L' containing water, as shown, and a pipe $l^6$ provided for supplying said tank with hot water or steam.

M represents a water-supply pipe, which when the water-pressure therein is too great or fluctuating may be provided with a reduction-valve $m$. It has on the eduction side of the reduction-valve a valve and hose-coupling $m'$, to which a hose $m^2$ may be attached to connect it with the branch $h$ for introducing water into either or both of the tanks F and G. A branch pipe $m^3$, provided with a valve and hose-coupling $m^4$, may be provided for supplying water to either of the tanks A A'. To fill either of said tanks with water, the Y C' is removed and the pipe C connected by hose $m^5$ with the pipe $m^3$.

This form of my apparatus operates as follows: Assuming that a pressure of eight pounds per square inch is necessary to feed the beer from the tanks A A' to the bottling-machines D D', the reduction-valve $b^2$ is set to close when the pressure in said tanks rises above eight pounds and the reduction-valve $l^2$ is set to open when the pressure falls below eight pounds. In starting the apparatus both of the tanks A and A' may be filled with water to exclude the air therefrom, the vent-valves $e'$ $e'$ being opened and the valves $e^2$ $e^2$ closed for this purpose. The water in one tank, for instance, A, is then displaced with gas by closing the vent-valve $e'$ and opening the valves $c$ and $e^2$ of that tank. When the water has been completely discharged from said tank, its valve $c$ is closed and its valve $b'$ opened, the valve $b^3$ in pipe B and the valves $c$ and $e^2$ of tank A' are opened and its valve $e'$ closed. Beer now flows through pipe B into tank A, displacing the gas therein and forcing it through pipe E into tank A', in which it displaces the water. When the tank A is filled with beer, it rises in lantern $e$, lifting the float-ball therein and closing the opening at the top into pipe E. The cubical contents or capacity of the tanks A A' being alike the water in tank A' will be completely displaced by gas when the tank A is filled with beer. The valve $b'$ of tank A and the valve $c$ of tank A' are now closed and the apparatus is ready to supply beer to the bottling-machines or filling apparatus D D'. One or more bottling-machines or filling apparatus, such as D, is connected by hose $d$ with pipe C of tank A. The valve $c$ in said pipe is opened and the valve $b'$ of tank A' is also opened. Beer now flows into tank A' under a pressure of at least eight pounds and displaces the gas therein, forcing it through pipe E and its connections into the top of tank A, in which it in turn displaces the beer, forcing it through the connections above mentioned to the bottling-machine D. This operation continues until tank A' is filled with beer and gas has completely displaced the beer in tank A, or until the flow of beer into tank A' or from tank A is stopped. When A is filled with gas and A' with beer, one or more bottling-machines or filling apparatus, such as D', is connected in the manner above explained with A', and the beer is shut off from A' and let into A. The operation may be thus continued indefinitely, each tank being alternately filled with beer and gas, the beer being fed from one tank to the bottling-machines by the gas which is displaced by the beer flowing into the other tank. During the operation of the apparatus, as above explained, the valve $e^6$ in pipe E remains closed and the valve $l^3$ open. In case the quantity of gas contained in the tanks A and A' and their connections is reduced by leakage, absorption, or otherwise, until it is insufficient to fill either tank and completely displace the beer therein when the other tank is filled with beer, the gas-pressure in pipe E and the partially-discharged tank will fall below the point at which the reduction-value $l^2$ is set to open, and thereupon said reduction-valve will open and admit sufficient gas from the reservoirs L to completely fill the partially-discharged tank and restore the required pressure therein. When the gas-pressure thus falls below the required point and either tank into which beer is admitted is filled, the beer is prevented from flowing therefrom through pipe E into the other tank by the float-ball or check-valve in the adjacent lantern $e$.

When the operation of the apparatus is temporarily arrested by stopping the flow of beer to the bottling-machines, the back pressure thus produced in the tanks A A' will automatically close reduction-valve $b^2$ and thus prevent the further flow of beer into either tank until the operation of the apparatus is resumed. Whenever the pressure indicated by gage $l^4$ in the gas-reservoirs L falls below that which it is necessary to maintain in the apparatus, the valve $l^3$ is closed and said reservoirs are replaced by others charged with gas under high pressure, or in case a permanent gas-recuperating reservoir is used it is replenished whenever the pressure therein falls below the required point. The safety-valve $e^4$ is set to open at a pressure somewhat in excess of that to be maintained in the tanks A and A' and their connections, as indicated by the gage $e^3$.

It is necessary or desirable at frequent intervals to wash or cleanse the tanks A A', and for this purpose to exclude both beer and gas therefrom without wasting the gas. Suppose, for illustration, that the tank A is filled with gas and it is desired to expel the gas therefrom for the purpose of washing it. For this operation the apparatus is prepared as follows: Fluid-pressure is supplied to pipe I by a pump or other means (not shown) sufficient to sustain a column of water equal in height to the depth of either tank F or G and to afford a surplus pressure equal to the gas-pressure maintained in tanks A and A'. The water-supply pipe M is connected by a hose $m^2$ with the branch $h$ of pipe H. The valve $h^2$ is closed and the valves $h'$, $h^3$, and $m'$ are opened. The valves $e^2$ $e^2$ and $l^3$ are closed and the valve $e^6$ opened. The water, being subjected to a pressure sufficient to sustain a column equal to the depth of tank F and in addition thereto to open the safety-valve $e^4$, flows into and fills said tank, expelling the air therefrom through pipes $e^5$ and E and valve $e^4$. When said tank is filled, the float-ball $f'$ closes the opening into pipe $e^5$ and prevents the water from rising therein. Valve $h'$ is now closed, and the pressure-regulating valve J having been set to open the waste or vent connection K of tank G when the pressure in pipe $e^5$ rises above eight pounds, valve $i$ is opened, admitting air or other fluid medium into tank G under pressure sufficient to sustain the water in tank F and to act with a surplus pressure of eight pounds or a little over. Pipe C of tank A is then connected by a hose $m^5$ with the water-supply pipe $m^3$, the valves $c$, $e^2$, and $m^4$ are opened, water enters said tank, displacing the gas therein and forcing it through pipes E and $e^5$ into tank F, displacing water therein and forcing it into tank G. As the water rises in tank G back pressure is created in tank F and the pipe $e^5$, and when such pressure rises above eight pounds it acts upon the piston $j^3$, moving the opening $j^2$ in tube $j$ opposite the vent or waste opening or pipe K. The air or fluid medium contained in tank G thus escapes, relieving the pressure therein until the pressure in pipe $e^5$ falls to eight pounds, when the piston $j^3$ is allowed to rise and the weighted lever $j^5$ to close the vent or waste opening. By this means and in the manner above explained water is held at any level in tank F against the ordinary gas-pressure maintained in the tanks A and A', and such pressure is kept nearly constant when gas is forced from either tank A or A' into tank F, displacing the water therein. When the gas has been completely displaced in tank A by water, the valve $e^2$ is closed. If the tank A' is filled with beer, it may be displaced by the gas contained in tank F and fed to the bottling-machines or filling apparatus by opening the valve $e^2$ of said tank A' and maintaining the pressure above mentioned in pipe I and leaving the valve $i$ therein open. As the gas passes out of tank F to displace the beer in tank A' water flows in through pipe H from tank G to take its place, and the pressure in tank G is consequently reduced, also reducing the gas-pressure in tank F and pipe $e^5$. However, when such pressure falls below eight pounds the piston $j^3$ of the regulating-valve is allowed to rise and the weighted lever $j^5$ to move the opening $j'$ opposite the connection with pipe I. Compressed air is thus admitted into said tank G and the required pressure restored in tank F and pipe $e^5$. The gas-pressure being thus restored shifts the regulating-valve and cuts off communication between tank G and pipe I. In this way the necessary gas-pressure to completely expel the beer from tank A' is produced and maintained.

From the foregoing explanation it will be seen that either of the storage or measuring tanks A A' may be temporarily or permanently disconnected for cleansing or repairing and the other tank operated in connection with the tanks F and G, the tank F serving to receive and hold the gas while the tank A or A' with which it is connected is being filled with beer, but under these conditions, when a single tank is employed for receiving the beer and delivering it to the bottling-machines or filling apparatus, the operations of filling and discharging the tank alternate with each other, and the pressure required to feed the beer to the bottling-machines is furnished by a medium other than the beer itself.

To resume the ordinary operation of the apparatus with both tanks A and A', after one of them has been disconnected, as above explained, the gas contained in tank F is returned into said tank A or A' and displaces the water with which it is filled and which is discharged therefrom through its pipe C. As soon as the water is completely expelled the valve $c$ in said pipe and the valve $e^6$ are closed. Beer may then be admitted into said tank A and the gas displaced therein utilized to force the beer contained in tank A' to the bottling-machines, as hereinbefore explained.

Referring to Fig. 2, illustrating a modification of the apparatus similar to that shown in Fig. 1, $A^2$ represents a tank or cistern such as is commonly employed in breweries for measuring beer as it is drawn from the storage-cellars for filling bottles, barrels, or other receptacles.

B' is the pipe leading from storage-cellars, and $b$ a branch connecting it with the lower part of said tank and provided with a valve $b'$. $a$ is a glass gage by means of which the level of the liquid in said tank may be observed.

C is a pipe leading out of the bottom or lower part of said tank and provided with a valve $c$ and a coupling $c'$ for the attachment of a branching pipe connection C' or hose, all like or similar to corresponding connections shown in Fig. 1.

F' and G' are two closed tanks or vessels similar to tanks F and G, and in like manner provided with glass gages $g$ $g$ and connected with each other at the bottom by a pipe H, which has a branch waste and filling connection $h$ with a valve $h'$, and on opposite sides thereof valves $h^2$ and $h^3$. The tank F', which constitutes the gas-receiver, is connected by a pipe E' with the top of tank $A^2$. This pipe is provided with a valve $e^7$ and a vent-valve $e^8$, between which the connection with said tank $A^2$ is made and a safety-valve $e^9$ is located. The upper end of gage $a$ and the upper end of the branch pipe $b$, below the valve $b'$, have connections with the pipe E', between tank $A^2$ and the valve $e^7$, to permit the beer to rise and fall in said gage as said tank is filled and emptied and to release the beer contained in pipe $b$. The tank F' is provided, like tank F, with float balls or valves $f$ and $f'$.

The fluid-pressure-pipe connection I, the pressure-regulating valve J, and the vent or waste connection K, associated with tank G', are like or similar to the parts designated by the same reference-letters in Fig. 1. The valve casing or cylinder $j^4$ is connected above the piston $j^5$ by a branch pipe with pipe E'. Connections like or similar to those shown in Fig. 1 may be provided for filling the tank $A^2$ and supplying the tanks F' and G' with water.

The operation of this form of apparatus is like that shown in Fig. 1 when one of the measuring-tanks A A' is disconnected and communication established between the other and the gas-receiving tank F. In this form of apparatus, however, air or fluid pressure other than that afforded by the beer itself is in constant requisition while the apparatus is in operation to maintain the requisite gas-pressure.

Referring to Fig. 3, illustrating apparatus embodying my invention and specially adapted to hotel and saloon use for drawing beer and similar beverages, $A^3$ $A^3$ designate the casks or barrels in which such beverages are ordinarily shipped and delivered, and which serve in this case the purpose of the tanks A, A', and $A^2$ in the apparatus already described, and $F^2$ is a tank performing the function of a gas-receiver like the tanks F and F', (shown in Figs. 1 and 2,) or either one of the tanks A and A' of Fig. 1.

L' L' are gas-reservoirs like or similar to the reservoirs L L, and similarly provided with valves $l$ $l$ and couplings by which they are attached to a pipe $l'$, leading in this case into the bottom of said tank $F^2$. This pipe is in like manner provided with a reduction-valve $l^2$, and between said valve and the tanks L' with a pressure-gage $l^4$. The tank $F^2$ is provided at or near the bottom with a safety-valve N, which may be conveniently attached to pipe $l'$ and with a cock and hose connection O. It is also provided near the bottom with a perforated plate or screen $f^3$, and a short distance above it with a glass-closed opening $f^4$ for noting the rise of water therein.

P is a pipe leading out of the top or upper part of the tank and connected by branches $p$ $p$ with valve-chambers Q Q and lanterns $e$ $e$. It is provided with a reduction-valve $p'$, and between it and said tank with a pressure-gage $p^2$, which, however, may be attached directly to the tank. A pressure-gage $p^3$ is connected with the pipe P or one of its branches on the opposite side of the reduction-valve $p'$. The valve-chambers Q Q are connected by a pipe R and branches $r$ $r$ with the bottom of the tank below the perforated plate $f^3$, and the pipe R is provided with a check-valve $r'$, closing toward said valve-chambers Q, and with a cock $r^2$. The lanterns $e$ $e$ have hose connections for the attachment of hose $s$ $s$, provided with cocks $s'$ $s'$, and couplings for attachment to faucets S S, which are driven into bung-holes in the upper ends of the barrels $A^3$ $A^3$.

T T designate bar-faucets attached to pipes $t$ $t$, leading into the cold-storage room or apartment in which the beer casks or barrels are placed, and provided with hose connections for the attachment of hose $u$ $u$, having couplings for attachment to faucets U U, which are driven into bung-holes in the bottoms or lower ends of the barrels.

V is a water-cock and hose connection located between or in convenient proximity with the faucets T T and provided with a hose $v$, having a coupling $v'$, by which it may be connected with either of said faucets. The cock V is connected by a pipe $v^2$ with a water-supply pipe W. This pipe $v^2$ may be provided with a reduction-valve $v^3$ and a pressure-gage $v^4$, as shown. These are especially desirable when the water-pressure is fluctuating or greater than the barrels $A^3$ $A^3$ can be safely subjected to. The pipe W is provided with a cock $w$ and a hose connection for the attachment of hose $w$, which has a coupling for attachment to the cock O.

The reduction-valves $l^2$, $p'$, and $v^3$ may be like or similar to that shown in Fig. 5, in which $v^5$ and $v^6$ are the induction and eduction connections, respectively, $v^7$ the valve proper closing toward the induction opening, $v^8$ a diaphragm connected with said valve and exposed to the pressure on the eduction side of the valve, $v^9$ a spring acting upon the diaphragm in opposition to the pressure within the valve-case, and $v^{10}$ a screw for adjusting the tension of the spring and setting the valve to open under any desired degree of pressure in the eduction side thereof. These valves operate also like a check-valve, permitting the passage of a fluid in one direction only, as indicated by arrows.

The lanterns $e$ $e$ may be made as shown in Fig. 4, in which $e^7$ designates a chamber having glass walls or glass-closed openings for observing the rise of liquid therein, and the operation of the float-ball $e^8$. It has a hose connection $e^9$ at the lower end and communicates at the upper end with a valve-chamber Q, provided with pipe connections $q'$ and $q^2$ for the attachment of the pipes $p$ and $r$, respectively. The pipe connection $q'$ has an inwardly-opening check-valve $q^3$, and the connection $q^2$ an outwardly-opening check-valve $q^4$. These check-valves can be conveniently made of rubber with slits, which will be opened by pressure on one side, but closed by pressure on the opposite side of the valves.

The last-described arrangement of my apparatus operates as follows: The tank $F^2$ having been filled with water to displace the air and the water then withdrawn to the level of the sight-opening $f^4$, one or more reservoirs L', containing highly-compressed gas, coupled with pipe $l'$, one or more casks or barrels containing beer or other similar beverage connected with the lanterns $e$ $e$ and with pipes $t$ $t$, and the reduction-valves $l^2$, $p'$, and $v^3$, and the safety-valve N properly set, the apparatus is ready for operation. Assuming that a gas-pressure of about eight pounds per square inch is required to feed the beer or other liquid from the casks $A^3$ $A^3$ to the faucets T T, the valve $l^2$ is adjusted to open when the pressure in tank $F^2$ falls below eight pounds, the valve $p'$ to close when the pressure in the casks exceeds eight pounds, the valve $v^3$ to reduce the water-pressure, say to thirty-five pounds, and the safety-valve N to open, say at forty pounds, or a pressure considerably under that for which the tank is tested. Since the quantity of gas in the storage-tank or receiver $F^2$ will vary from time to time as more or less beer is drawn and more or less barrels emptied, the pressure will vary correspondingly. It follows, therefore, that the tank should be made of sufficient size to receive and hold the greatest quantity of gas that may be returned to it at any time from the emptied barrels, without increasing the pressure therein above a certain point, or something less than the water-pressure after passing the reduction-valve $v^3$. Gas passing from tank $F^2$ through pipe P and its branches $p$ $p$ enters the barrels with a pressure of eight pounds and displaces the beer therein as it is drawn from the faucets T T. The check-valves $q^3$ $q^3$ (shown in Fig. 4) prevent the gas from passing from one barrel through pipes $p$ $p$ into the other barrel. When the beer in either barrel has been completely displaced by gas, the hose $v$ is attached to the faucet T with which it is connected and waterworks water turned on. The water entering the barrel with a pressure considerably in excess of the gas-pressure displaces the gas and forces it through the hose connection $s$ with said barrel and pipes $r$ R into the bottom of tank $F^2$, in which it passes upwardly through the water and is thus washed and freed from any impurities it may contain. The check-valves $q^4$ $q^4$ prevent the gas expelled from one barrel from passing through pipes $r$ $r$ into the other, and the check-valve $r'$ prevents a backflow of gas or water in pipe R. When the gas is completely expelled from the barrel, the water rises through hose $s$ into lantern $e$, lifting the float-ball $e^8$ therein and closing the opening into valve-chamber Q. The cock $s'$ is then closed, the hose $s$ detached from faucet S, and the faucets S and U removed from the barrel, which is replaced by another filled with beer. The water contained in hose $s$ should be discharged by opening cock $s'$ before another barrel is connected. The water in the bottom of tank $F^2$ should be renewed from time to time. For this purpose the cock $r^2$ is closed to prevent the escape of gas from the barrels, and the cock O is opened. Fresh water is introduced to replace that withdrawn from the tank by attaching the hose $w'$ to the cock O and opening the cock $w$. If from any cause the pressure in said tank should rise above the point at which the safety-valve N is set to open, said valve will open, and, being connected with the tank below the water-level, water instead of gas will escape and thus relieve the pressure in said tank without loss of gas. The reduction-valves shown and described in the water connections of the several forms of apparatus shown in the drawings are provided to prevent the water from producing too great pressure within and thus bursting or injuring the apparatus.

By my process and apparatus air may be used to advantage in place of gas, since being brought repeatedly into contact with the beer or other carbonated beverages it will receive therefrom and in time become strongly charged or impregnated with carbonic-acid gas and thus to a certain extent, at least, serve the purpose of pure gas provided at the outset. Therefore I do not wish to be understood as limiting myself to the use of carbonic-acid gas, but within the spirit and intended scope of my invention I may employ any other gas suitable for the purpose, or air, as above explained, and by the term "gas," as employed in my claims, I mean to include air as well as other gases.

In place of compressed air for producing pressure upon the water or liquid contained in tank G in either form of apparatus it is obvious that water or any other suitable fluid medium may be employed.

Various modifications and changes may be made in the details of the apparatus other than those hereinbefore suggested without departure from the spirit of my invention.

I claim—

1. The process of recovering and reusing gas employed to displace liquids for bottling and other purposes, which consists in forcing gas into a vessel containing the liquid to be displaced and thereby expelling said liquid therefrom, then filling said vessel with other liquid under pressure, thereby forcing the gas therefrom through a separate passage leading out of the upper part thereof into a reservoir which is disconnected from the source of liquid supply and drawing the gas from said reservoir to displace other liquid in the same or in other vessels, substantially as and for the purposes set forth.

2. The process of recovering and reusing gas employed to displace liquids for bottling and other purposes, which consists in forcing the gas from the vessel in which it has displaced a liquid, through a passage leading out of the upper part of said vessel into a receiver connected therewith, but is disconnected from the source of liquid supply by refilling said vessel with a liquid under pressure, drawing the gas from said receiver to displace other liquid, and in maintaining the pressure in said receiver above a certain point, substantially as and for the purposes set forth.

3. The process of recovering and reusing gas employed to displace liquids for bottling and other purposes, which consists in forcing the gas from the vessel in which it has displaced a liquid, through a passage leading out of the upper part of said vessel into a receiver connected therewith, but is disconnected from the source of liquid supply by refilling said vessel with a liquid under pressure, drawing the gas from said receiver to displace other liquid and in restoring the pressure in said receiver when it falls below a certain point by means of fluid-pressure other than that afforded by the gas itself substantially as and for the purposes set forth.

4. The process of recovering and reusing gas employed to displace liquids for bottling and other purposes, which consists in forcing the gas from the vessel in which it has displaced a liquid, into a receiver connected therewith, by refilling said vessel with a liquid under pressure, drawing such gas from said receiver to displace other liquid, and maintaining a constant gas-pressure in said receiver by increasing and diminishing the pressure of an interposed liquid, according to the varying volume of gas contained in said receiver, substantially as and for the purposes set forth.

5. The process of recovering and reusing gas employed to displace liquids for bottling and other purposes, which consists in forcing the gas alternately from one vessel into another vessel containing liquid by alternately refilling said vessels with liquid to be subsequently displaced by said gas, substantially as and for the purposes set forth.

6. The process of recovering and reusing gas employed to displace liquids for bottling and other purposes, which consists in forcing the gas alternately from one vessel into another vessel containing liquid by refilling said vessels alternately with liquid under pressure to be subsequently displaced by said gas, and in maintaining the requisite quantity and pressure of gas by connecting said vessels with a reservoir containing gas under greater pressure, substantially as and for the purposes set forth.

7. In apparatus for recovering and reusing gas employed to displace liquids for bottling and other purposes, the combination of a tank or vessel for holding the liquid to be displaced, having an outlet connection with the lower part thereof, a source of liquid under pressure which is greater than the normal gas-pressure required to displace the liquid, adapted to be connected and disconnected with said vessel, a gas-receiver connected with the upper part of said vessel and adapted to receive gas therefrom when said vessel is filled with liquid and means for maintaining gas under sufficient pressure in said receiver to expel the liquid from said vessel when the liquid-supply connection thereto is closed, substantially as and for the purposes set forth.

8. In apparatus for recovering and reusing gas employed to displace liquids for bottling and other purposes, the combination of a receiver having a valve-controlled connection for putting it in communication with the upper part of a vessel containing a liquid to be displaced by gas taken from said receiver, a valve-controlled connection for drawing off liquid from the lower part of said vessel, a source of liquid under pressure having a valve-controlled connection with, or for attachment to, said vessel, a gas-reservoir connected with said receiver and a reducing-valve between said reservoir and receiver for supplying waste and maintaining a certain pressure in the reservoir, substantially as and for the purposes set forth.

9. In apparatus for recovering and reusing gas employed to displace liquids for bottling and other purposes, the combination of a tank or vessel having a valve-controlled liquid-outlet connection leading from the lower part thereof, a gas tank or receiver having a valve-controlled connection with the upper part of said vessel, and a fluid-pressure tank connected with the bottom of said receiver and containing a liquid, substantially as and for the purposes set forth.

10. In apparatus for recovering and reusing gas employed to displace liquids for bottling and other purposes, the combination of two or more tanks or vessels, each having a liquid-outlet connection leading out of the lower part thereof, a liquid-supply pipe having valve-controlled connections with said tanks and with a source of liquid under pressure, and a valve-controlled gas connection between the upper parts of said tanks, substantially as and for the purposes set forth.

11. In apparatus for recovering and reusing gas employed to displace liquids for bottling and other purposes, the combination of two or more tanks or vessels, each having a liquid-outlet connection at the bottom, a gas connection between the upper parts thereof, and a liquid-supply pipe connecting each of said tanks with a source of liquid under pressure, and provided with a reducing-valve, substantially as and for the purposes set forth.

12. In apparatus for recovering and reusing gas employed to displace liquids for bottling and other purposes, the combination of two or more tanks or vessels, each having a liquid-outlet connection at or near the bottom and a gas connection with each other at or near the top provided with float-valves, and a liquid-supply pipe connecting each of said tanks with a source of liquid under pressure greater than the gas-pressure required to expel liquid from said tanks, substantially as and for the purposes set forth.

13. In apparatus for recovering and reusing gas employed to displace liquids for bottling and other purposes, the combination of a tank or vessel having a valve-controlled discharge connection at the bottom, a gas-receiver having a valve-controlled connection with the upper part of said tank, and a water-supply pipe connected with a source of pressure greater than that required to expel the liquid from said tank, provided with a reducing-valve and with a detachable connection for attachment to said tank or vessel, whereby the gas which has displaced the liquid therein may be completely forced back into said receiver, substantially as and for the purposes set forth.

14. In apparatus for recovering and reusing gas employed to displace liquids for bottling and other purposes, the combination of a tank or vessel for containing the liquid to be displaced, having a liquid-outlet connection at or near the bottom, a gas-receiver connected with the upper part of said tank and a fluid-pressure connection with the lower part of said receiver provided with an automatic pressure-regulating valve, substantially as and for the purposes set forth.

15. In apparatus for recovering and reusing gas employed to displace liquids for bottling and other purposes, the combination of a tank or vessel for containing the liquid to be displaced, having a liquid-outlet connection at or near the bottom, a gas-receiver connected at or near the top with the upper part of said tank and connected at or near the bottom with a source of liquid under pressure, and float-valves controlling the liquid-inlet and gas-outlet openings of said receiver, substantially as and for the purposes set forth.

16. In apparatus for recovering and reusing gas employed to displace liquids for bottling and other purposes, the combination of a tank or vessel for containing the liquid to be displaced, having an outlet connection at or near the bottom, a gas-receiver connected with the upper part of said tank, a fluid-pressure tank supplied with liquid and connected with a source of fluid-pressure and at the bottom with the bottom of said receiver, and an automatic pressure-regulating device controlling the supply connection of said fluid-pressure tank and connected with the upper part of said gas-receiver, substantially as and for the purposes set forth.

17. In apparatus for recovering and reusing gas employed to displace liquids for bottling and other purposes, the combination of two or more tanks or vessels, each having a valve-controlled outlet connection at the bottom, a liquid-supply pipe having separate valve-controlled connections with said tanks, a gas-pipe having separate valve-controlled connections with the upper parts of said tanks, a gas-receiver having a valve-controlled connection with said gas-pipe, and a gas-reservoir having a connection with said gas-pipe, provided with a reduction-valve for restoring and maintaining the pressure therein, substantially as and for the purposes set forth.

In testimony that I claim the foregoing as my own I affix my signature in presence of two witnesses.

JACOB F. THEURER.

Witnesses:
R. BIRKHOLZ,
CHAS. L. GOSS.